(12) United States Patent
Brodsky et al.

(10) Patent No.: US 12,126,751 B2
(45) Date of Patent: *Oct. 22, 2024

(54) MACHINE LEARNING FOR DETERMINING COMMUNICATION PROTOCOLS

(71) Applicant: Capital One Services, LLC, McLean, VA (US)

(72) Inventors: Sara Brodsky, New York, NY (US); Jennifer Kwok, Brooklyn, NY (US); Tania Cruz Morales, Washington, DC (US); Joshua Edwards, Philadelphia, PA (US); Abhay Donthi, Washington, DC (US); Jason Zwierzynski, Chapel Hill, NC (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/366,658

(22) Filed: Aug. 7, 2023

(65) Prior Publication Data

US 2023/0388403 A1    Nov. 30, 2023

Related U.S. Application Data

(63) Continuation of application No. 17/321,571, filed on May 17, 2021, now Pat. No. 11,750,731.

(51) Int. Cl.
*H04W 68/00*    (2009.01)
*G06F 18/214*    (2023.01)
*G06N 20/00*    (2019.01)
*H04B 1/00*    (2006.01)
*H04M 1/724*    (2021.01)

(52) U.S. Cl.
CPC ........ *H04M 1/724* (2021.01); *G06F 18/214* (2023.01); *G06N 20/00* (2019.01)

(58) Field of Classification Search
CPC ...... H04M 1/724; G06F 18/214; G06F 18/24; G06N 20/00; G06N 3/092; G06Q 10/06; H04B 1/005; H04W 68/00
See application file for complete search history.

(56) References Cited

U.S. PATENT DOCUMENTS 11,750,731 B2 *   9/2023   Brodsky .............. G06F 18/214
                                                                455/550.1

* cited by examiner

*Primary Examiner* — Andrew Wendell
(74) *Attorney, Agent, or Firm* — Foley & Lardner LLP

(57) ABSTRACT

Methods and systems are disclosed herein for using one or more machine learning models to determine whether a user is expected to complete a task or action by a deadline. The one or more machine learning models may be trained and/or used to recommend a communication protocol for sending a reminder to the user such that the user is predicted to be more likely to complete an action by the action's deadline. A computing system may use the one or more machine learning models to generate a recommendation for type of reminder to send, for example, if it is predicted that the user is not expected to complete the task by the deadline. A computing system may determine the message to send, the communication protocol to use, and/or the time to send the message.

20 Claims, 7 Drawing Sheets

| Date | Action | Completed On Time? |
|---|---|---|
| Jan 2021 | Monthly payment | Yes |
| Feb 2021 | Monthly payment | No |
| March 2021 | Monthly payment | No |

FIG. 2

MACHINE LEARNING FOR DETERMINING COMMUNICATION PROTOCOLS

CROSS-REFERENCE TO RELATED APPLICATION(S)

This application is a continuation of U.S. patent application Ser. No. 17/321,571, filed May 17, 2021. The content of the foregoing application is incorporated herein in its entirety by reference.

BACKGROUND

It can be difficult for some users to remember to complete some actions (e.g., tasks). Reminders to complete an action may be effective in some circumstances, but may also be ineffective if, for example, the reminder is lost amidst a deluge of messages. Users may be inundated with messages and so may pay less attention to reminders, because the reminder blends in with other messages. For some users, reminders for some actions are not necessary and sending a reminder may be an inefficient use of computing resources. It may be difficult to determine whether a reminder message should be sent and whether a reminder is helpful for the user.

SUMMARY

To address these and other issues, one or more machine learning models may be used by a notification system to determine whether a user is predicted to complete a task or action by a given deadline. A machine learning model may predict a communication protocol that may be most effective in reminding the user to complete the action, for example, after another or the same machine learning model determines that the user is not predicted to complete an action. Some users may find one communication protocol more helpful than other communication protocols (e.g., a reminder over one communication protocol may lead to an increase of completing actions by their corresponding deadlines, but a reminder of another communication protocol may not lead to an increase in completing actions). The one or more machine learning models may be trained and/or used to recommend a communication protocol for sending a reminder to the user such that the user is more likely to complete an action by the action's deadline. A notification system may use the one or more machine learning models to generate a recommendation for a type of reminder to send (e.g., a communication protocol to use), for example, if it is predicted that the user is not expected to complete the task by the deadline. For example, if a message with instructions for completing a task was sent using electronic mail, and the user has still not completed the task with the deadline approaching, a machine learning model may recommend sending a reminder via a mobile application or via a phone call. By determining an alternative communication protocol or message type (e.g., chat or text message, electronic mail, phone call, web application, mobile application, etc.), the notification system may be able to send a more effective reminder to the user (e.g., a message that is more likely to cause the user to complete the action). A notification system may determine (e.g., via machine learning) the message to send, the communication protocol to use, and/or the time to send the message. A notification system that uses a machine learning model to determine a communication protocol for a message may improve the efficiency of message processing on mobile devices because it may reduce the need to send additional messages (e.g., reminders), which require additional computer resources (e.g., network bandwidth, processing time, etc.). Furthermore, using a machine learning model to determine more effective communication protocols may improve user experience (e.g., because the user may complete the action by the deadline and avoid negative consequences from completing the action late or not completing the action).

The notification system may send a message using a first electronic communication protocol to a user device. The message may indicate an action for the user to complete and may include a link (e.g., a Uniform Resource Locator (URL)) where the action may be completed and a deadline for completing the action. For example, the notification system may send an email to a user to indicate that a payment is due on the user's account. The email may include a link to the account where payment may be made and a deadline for the payment. The notification system may receive a data structure that includes previous actions and corresponding results for each action (e.g., indicating whether the user completed each action request on time or not). For example, the notification system may receive a data structure containing the previous thirty-six months of payment history of the user (e.g., indicating whether the user made each monthly payment timely and withing how many days of the deadline). The notification system may determine whether the action indicated in the message has been completed. If, for example, the action has not been completed, the notification system may use a machine learning model to determine whether the user is predicted to complete the action by the deadline. The machine learning model may use previous action history, information about the user's interactions with the message (e.g., whether the message has been read, whether the link was interacted with, etc.) and/or information about the action as input to generate a prediction. The notification system may use a machine learning model to determine a communication protocol for sending a reminder message, for example, if the notification system determines that the user is unlikely to complete the action timely. The notification system may use a reinforcement learning model that uses completion of the action as a reward for training. The reinforcement learning model may learn which communication protocol is effective at helping the user to complete the action. For example, the machine learning model may learn that a user is more likely to complete the action if the user receives a phone call a day before the deadline. The notification system may send a second message (e.g., a reminder message) via the second electronic communication protocol that was recommended via the machine learning model. Future messages sent to the user (e.g., user device associated with the user), may be sent via the communication protocol recommended by the machine learning model.

Various other aspects, features, and advantages of the disclosure will be apparent through the detailed description of the disclosure and the drawings attached hereto. It is also to be understood that both the foregoing general description and the following detailed description are examples and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

BRIEF DESCRIPTION OF THE DRAWINGS

FIG. 2 shows an example data structure that may be used as input to a machine learning model, in accordance with some embodiments.

DETAILED DESCRIPTION OF THE DRAWINGS

In the following description, for the purposes of explanation, numerous specific details are set forth in order to provide a thorough understanding of the disclosure. It will be appreciated, however, by those having skill in the art, that the disclosure may be practiced without these specific details or with an equivalent arrangement. In other cases, well-known structures and devices are shown in block diagram form to avoid unnecessarily obscuring the disclosure.

Figure 1:
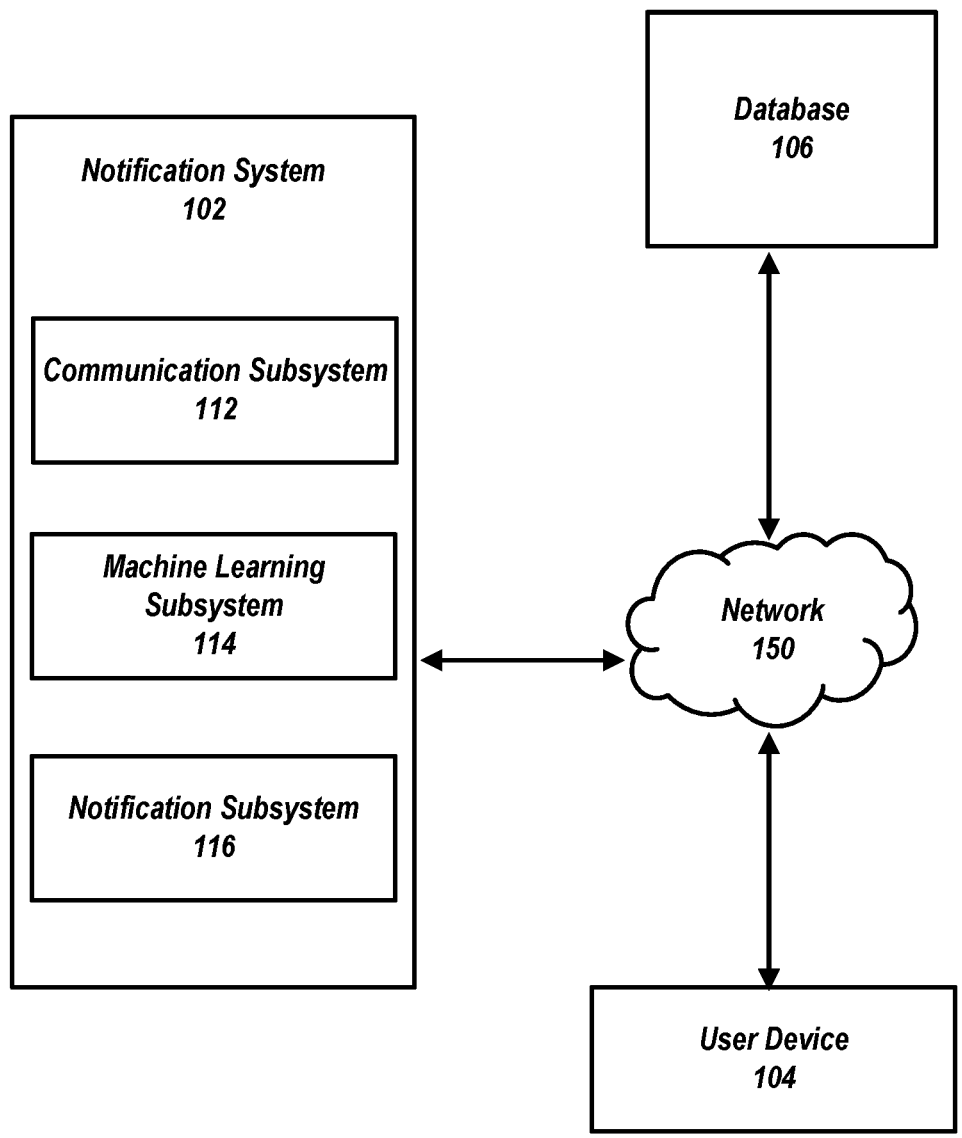
FIG. 1 shows an example notification system for using machine learning to determine communication protocols, in accordance with some embodiments.

FIG. 1 shows an example computing system 100 for using machine learning to determine communication protocols for reminder messages. The computing system 100 may determine a communication protocol that leads to more timely completion of an action (e.g., because some users may respond better to one communication protocol or types of messages). An action may include making a payment on an account, submitting a report, send a message, complete a work assignment, signing a document, or any other type of task. A communication protocol may include file transfer protocols, messaging or calling protocols (e.g., Simple Mail Transfer Protocol (SMTP), Internet Message Access Protocol (IMAP), Voice over Internet Protocol (VoIP), etc.), Internet protocols, or any other type of protocol used for communicating. The use of the term communication protocol below may be interchangeable with message type (e.g., chat, text, email, phone call, mobile application notification, or any other type of electronic message).

The computing system may use one or more machine learning models to output a prediction/determination of whether a user is expected to complete an action. The one or more machine learning models may be trained and/or used to recommend a communication protocol for sending a reminder to the user such that the user is more likely to complete an action by the action's deadline. A notification system may use the one or more machine learning models to generate a recommendation for type of reminder to send a message and/or a reminder message. For example, if a message indicating a task was sent via a letter, and the user has still not completed the task with the deadline approaching, a machine learning model may recommend sending a reminder via email or via a phone call. By determining an alternative communication protocol or message type (e.g., chat or text message, email, phone call, web application, mobile application, etc.), the notification system may be able to send a more effective message to the user (e.g., a message that is more likely to cause the user to complete the action). A notification system may determine (e.g., via machine learning) the message to send, the communication protocol to use, and/or the time to send the message. A notification system that uses a machine learning model to determine a communication protocol for a message may improve the efficiency of message processing on mobile devices because it may reduce the need to send additional messages (e.g., reminders), which require additional computer resources (e.g., network bandwidth, processing time, etc.). Further, using a machine learning model to determine more effective communication protocols may improve user experience (e.g., because the user may complete the action by the deadline and avoid negative consequences from completing the action late).

The system 100 may include a notification system 102, a user device 104, and/or a database 106. The notification system 102 may include a communication subsystem 112, a machine learning (ML) subsystem 114, and/or a notification subsystem 116. The communication subsystem 112 may send a message to user device. The message may indicate an action to be completed by the user. The message may include information to assist the user in completing the task. For example, the message may include a URL or link to a resource where the user may complete the action. The message may indicate a deadline by which the action should be completed. For example, the message may be an email that indicates a monthly payment should be completed by the user and may indicate a deadline for completing the payment and a link to a web application where the user may input payment information.

The communication subsystem 112 may receive from the database 106, action completion information associated with the user. The action completion information may be used by one or more machine learning models to generate a prediction of whether the user will complete the task by the deadline and/or generate a recommendation for a communication protocol to use for sending a reminder to the user to complete the action. The action completion information may include previous actions associated with the user and whether the action was completed on time. For example, FIG. 2 shows a table with example action completion information 200. The action completion information 200 may include a column for a deadline 203 for each action, a column indicating the action 206, and/or a column indicating whether the action was completed by the deadline 209. The action completion information may correspond to any type of action. For example, the action may include monthly payments, submitting reports, or any other action (e.g., as discussed above). The action completion information may further include an indication of a frequency the user has accessed an application associated with the action. For example, the number of times the user has interacted with (e.g., read, opened, interacted with a link inside a message, etc.) a message in a given time period (e.g., one week, one day, one month, etc.).

The action completion information may further include an indication of when a user has completed an action in the past in relation to the deadline. For example, the action completion information may indicate that the user typically completes an action 3 days prior to the deadline (e.g., the user's average completion date is 3 days before the deadline, the median completion date for all users is 3 days before the deadline, etc.). If the action has not been completed by 2 days before the deadline, a machine learning model (e.g., as discussed in more detail below) may determine to send a reminder to the user to complete the action.

Additionally or alternatively, the communication subsystem 112 may receive an indication of whether the action has been completed by the user. For example, the communication subsystem 112 may receive updates (e.g., by retrieving information from one or more databases) indicating which users have completed which actions. The notification system 102 may avoid sending messages, for example, to users that have completed actions and/or have a history of completing actions on time.

Figure 3:
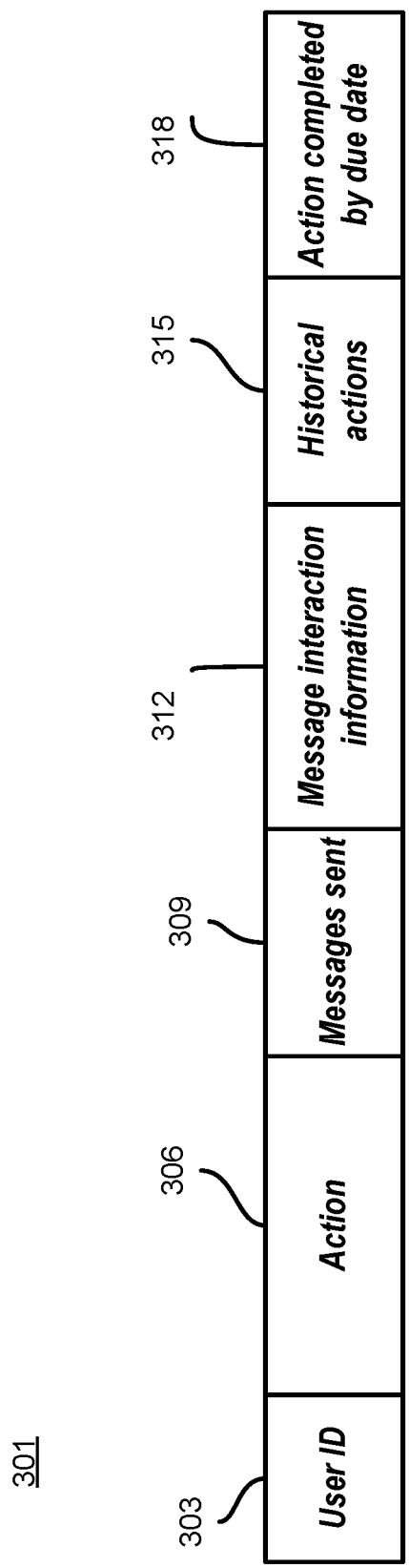
FIG. 3 shows features that may be used by a machine learning model to determine whether an action will be completed on time, in accordance with some embodiments.

The ML subsystem 114 may generate an input vector for use in a machine learning model, for example, if the communication subsystem 112 determines that the action has not been completed (e.g., if information received by the communication subsystem 112 indicates that the action has not been completed). The input vector may be used as input to a machine learning model to generate a prediction of whether the user is expected to complete the task by the deadline. The input vector may include action completion information (e.g., as discussed above), information about the action (e.g., the type of action, amount of payment, deadline, etc.), and/or user interaction information associated with the message. The user interaction information may indicate whether the user has read the message associated with the action, when the message was read, whether the message was archived, whether the message was automatically archived (e.g., without the user reading the message), whether any content in the message was downloaded from a server, whether a link or URL was interacted with, etc. Referring to FIG. 3, an example feature set 301 with features that may be input into a machine learning model is shown. The features may be used by one or more machine learning models for predicting whether the user will complete the action. One or more of the features shown in FIG. 3 may be included in the input vector. The example feature set 301 includes a user identification 303, the action to be completed 306 (e.g., the action for which a prediction is being made by the machine learning model), an indication of messages that have been previously sent to the user 309, message interaction information 312, historical actions 315 (e.g., the action completion information discussed above, other actions assigned to the user, etc.), and an indication of whether the action is to be completed by the deadline feature 318. The feature 318 may be used as a label for training the machine learning model and/or may be what the machine learning outputs as a prediction.

Referring to FIG. 1, the ML subsystem 114 may input the generated input vector into a machine learning model (e.g., a supervised machine learning model) to obtain a prediction of whether the user will compete the action by the deadline. For example, the machine learning model may output a value indicating that the action is predicted to be completed on time or that the action is predicted to not be completed on time. A machine learning model may be used to recommend a communication protocol, for example, if the prediction indicates that the action will not be timely completed.

The ML subsystem 114 may use a machine learning model to determine a communication protocol to use to send a reminder message to complete the task, for example, if a prediction indicating that the user will not complete the task by the deadline is obtained. The machine learning model may be able to train to determine a communication protocol for sending a reminder that is more likely to result in completion of the task. For example, if a message associated with an action is sent via email and the user still has not completed the action as the deadline approaches, the machine learning model may determine that a phone call reminder at 2:00 pm on the deadline or sending a letter to the user may result in timely completion of the action. The reminder may be determined based on how much time remains before the deadline to complete the action. For example, if a reminder letter takes three days (e.g., on average) to arrive, and there are only two days remaining before the deadline, the notification system 102 may avoid sending a reminder via a letter, for example, even if user preferences indicate that the letters are the preferred type of reminder. The machine learning model for determining the communication protocol may be the same machine learning model used to generate the prediction of whether the task will be completed by the deadline or may be a different model.

Figure 4A:
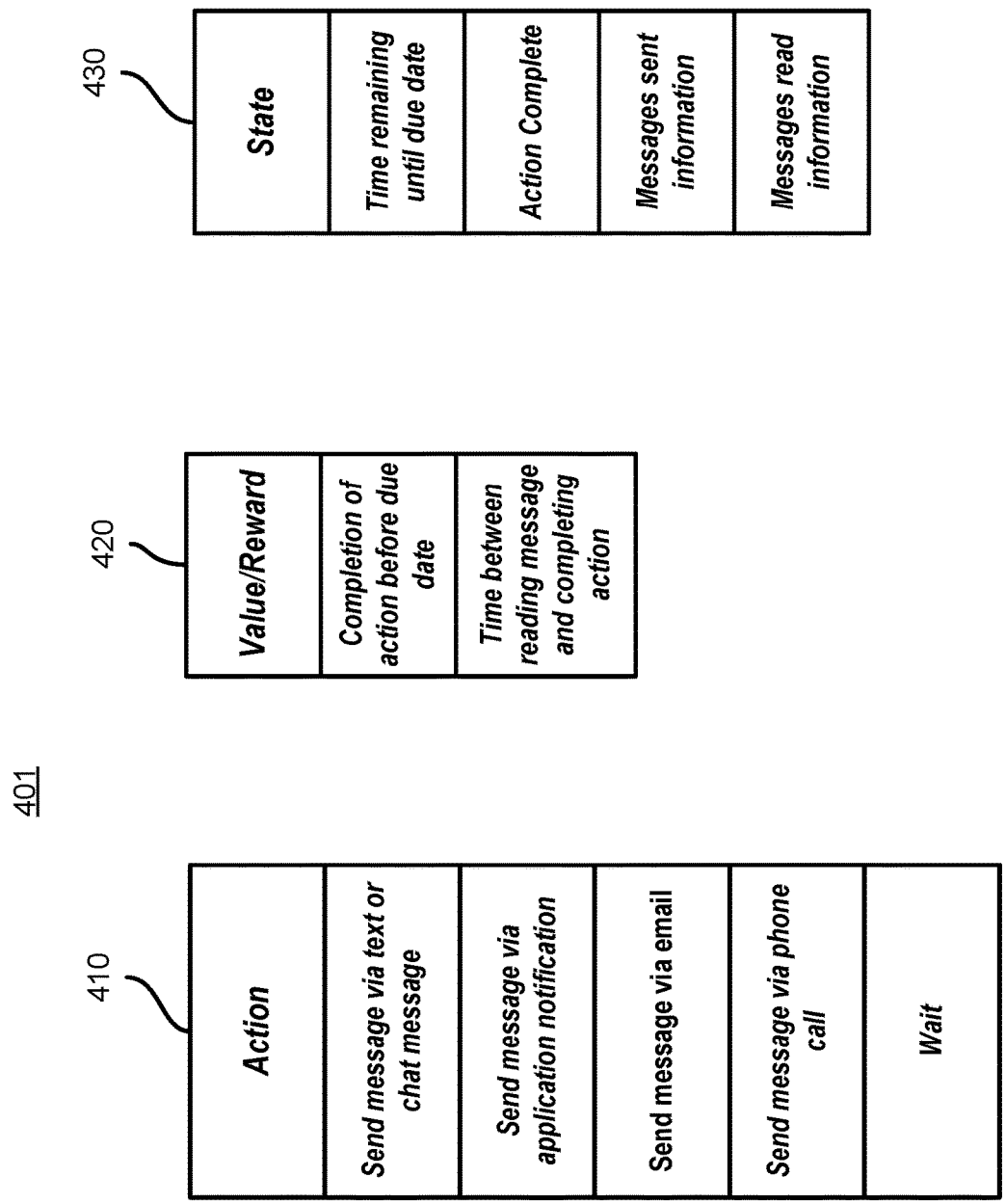
FIG. 4A shows an example reinforcement learning policy that may be used by a machine learning model to determine a communication protocol, in accordance with some embodiments.

The machine learning model for determining a communication protocol may be a reinforcement learning model. The machine learning model may take as input any of the features described above (e.g., in connection with FIGS. 2-3) and may output a communication protocol to use for sending a reminder message and/or an indication of when the reminder message should be sent. The machine learning model may implement a reinforcement learning policy that includes a set of actions, a set of rewards, and/or a state. For example, FIG. 4A shows an example reinforcement learning policy 401 that may be implemented or used by the machine learning model. The reinforcement learning policy 401 may include an action set 410 that indicates the actions that the machine learning model may use (e.g., the machine learning model may output an action selected from the action set 410). The actions that the machine learning model may select from may include an indication of a communication protocol and/or whether to wait before sending a reminder message. For example, the action set may include sending a message via a text or chat message, sending a message via an application notification or message (e.g., a mobile application notification or message, a desktop notification or message, a web application notification or message, etc.). The application may be associated with the action. For example, if the action includes submitting a document via a mobile application, the action may include sending a notification to the user via the mobile application. As additional examples, the action set 410 may include sending a message via email, sending a message via a phone call (e.g., an automated phone call with voice output), or causing the sending of a letter with a reminder message.

The reinforcement learning policy 401 may include a reward set (e.g., value set) 420 that indicates the rewards that the machine learning model obtains (e.g., as the result of the sequence of multiple actions). The reward set 420 may indicate that a reward is received and the amount of the reward (e.g., 100 points) if the action is completed before the deadline. The reward set 420 may indicate that the amount of a reward that is received is based on the amount of time that transpires between sending a reminder message and completion of the task. For example, a greater reward may be received if the task is completed within one hour of receiving the message rather than two weeks transpiring after receiving the message (e.g., regardless of whether the action is completed by the deadline). The machine learning model may implement a loss function that optimizes for the maximum reward based on the reward set 420. For example, the machine learning model may be trained to select actions that lead to higher rewards (e.g., that lead to tasks being completed before their corresponding deadlines).

The reinforcement learning policy 401 may include a state 430 that indicates the environment or state that the machine learning model is operating in. The machine learning model may output a selection of an action based on the current state. The state 430 may be updated at a predetermined frequency (e.g., daily, every 4 hours, or any other frequency). The machine learning model may output an action in response to each update of the state. For example, if the state is updated at the beginning of each day, the machine learning model may output an action to take based on the action set and/or one or more weights that have been trained/adjusted in the machine learning model. For example, if the deadline is more than one week away the machine learning model may output an indication of the "wait" action. This output may indicate that no action should be taken and/or that more time (e.g., until one or more state updates have occurred) should transpire before a reminder message is sent. The state may include an indication of the time remaining until the deadline, whether the action has been completed or not, an indication of messages that have been previously sent to the user, an indication of communication protocols that have been previously used to send messages associated with the current action or previous actions, user interaction information (e.g., as discussed above in connection with FIGS. 1-2). The state may include user information (e.g., the user's preferences for communication protocols, whether the user prefers to receive email reminders, phone reminders, or paper statements, etc.). One or more machine learning models implemented/used by the ML subsystem 114 may include a Q-learning network (e.g., a deep Q-learning network) that implements the reinforcement learning policy 401.

Referring to FIG. 1, the ML subsystem 114 may use the machine learning model (e.g., any machine learning model discussed above) to output a recommendation of a communication protocol (e.g., an action selected from the action set as described in connection with FIGS. 4A-4B). The recommended communication protocol to use for a reminder message may be the same as the communication protocol used to send the message indicating the action or may be a different communication protocol. The communication subsystem 112 may provide a reminder message to the user device 104 via the second communication protocol and/or cause a paper letter to be sent to the user to remind the user of the task. In some embodiments, the notification system 102 may modify a setting associated with the user account based on the recommendation generated by the machine learning model. For example, if the machine learning model recommends sending a message (e.g., a reminder message) via email, the notification system 102 may enroll the user in paperless statements. As an additional example, if the machine learning model recommends sending messages or notifications via an application (e.g., a mobile application) the notification system 102 may prevent emails from being sent to the user (e.g., to avoid duplication of messages). The setting may indicate that future communications or messages should be sent via the communication protocol that was recommended by the machine learning model.

The user device 104 may be any computing device, including, but not limited to, a laptop computer, a tablet computer, a hand-held computer, smartphone, other computer equipment (e.g., a server or virtual server), including "smart," wireless, wearable, and/or mobile devices. The user device 104 may receive messages and/or reminder messages from the notification system 102 (e.g., as discussed above).

Although only one client device 104 is shown, the system 100 may include any number of client devices, which may be configured to receive messages/reminders from the notification system 102 via the network 150.

The notification system 102 may include one or more computing devices described above and/or may include any type of mobile terminal, fixed terminal, or other device. For example, the notification system 102 may be implemented as a cloud computing system and may feature one or more component devices. A person skilled in the art would understand that system 100 is not limited to the devices shown in FIG. 1. Users may, for example, utilize one or more other devices to interact with devices, one or more servers, or other components of system 100. A person skilled in the art would also understand that while one or more operations are described herein as being performed by particular components of the system 100, those operations may, in some embodiments, be performed by other components of the system 100. As an example, while one or more operations are described herein as being performed by components of the notification system 102, those operations may be performed by components of the client device 104, and/or database 106. In some embodiments, the various computers and systems described herein may include one or more computing devices that are programmed to perform the described functions. Additionally or alternatively, multiple users may interact with system 100 and/or one or more components of system 100. For example, a first user and a second user may interact with the notification system 102 using two different client devices.

In some embodiments, the notification system 102 may be part of the user device 104. Providing a message may include outputting a sound, displaying an element in a user interface, vibrating the user device 104, sending information to the user device 104 (e.g., that causes the user device 104 to display a notification), or any other way of providing a notification that may be known to a person of ordinary skill in the art. In some embodiments, the notification system 102 and the user device 104 may be separate devices and providing a message may include sending, by the notification system 102, the message to the user device 104.

One or more components of the notification system 102, client device 104, and/or database 106, may receive content and/or data via input/output (hereinafter "I/O") paths. The one or more components of the notification system 102, the client device 104, and/or the database 106 may include processors and/or control circuitry to send and receive commands, requests, and other suitable data using the I/O paths. The control circuitry may include any suitable processing, storage, and/or input/output circuitry. Each of these devices may include a user input interface and/or user output interface (e.g., a display) for use in receiving and displaying data. It should be noted that in some embodiments, the notification system 102, the client device 104, and/or the database 106 may have neither user input interface nor displays and may instead receive and display content using another device (e.g., a dedicated display device such as a computer screen and/or a dedicated input device such as a remote control, mouse, voice input, etc.). Additionally, the devices in system 100 may run an application (or another suitable program). The application may cause the processors and/or control circuitry to perform operations related to using machine learning to determine when notifications should be sent.

One or more components and/or devices in the system 100 may include electronic storages. The electronic storages may include non-transitory storage media that electronically stores information. The electronic storage media of the electronic storages may include one or both of (a) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 1 also includes a network 150. The network 150 may be the Internet, a mobile phone network, a mobile voice or data network (e.g., a 5G or LTE network), a cable network, a public switched telephone network, a combination of these networks, or other types of communications networks or combinations of communications networks. The devices in FIG. 1 (e.g., notification system 102, the client device 104, and/or the database 106) may communicate (e.g., with each other or other computing systems not shown in FIG. 1) via the network 150 using one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The devices in FIG. 1 may include additional communication paths linking hardware, software, and/or firmware components operating together. For example, the notification system 102, any component of the notification system (e.g., the communication subsystem 112, the ML subsystem 114, and/or the notification subsystem 116), the client device 104, and/or the database 106 may be implemented by one or more computing platforms.

Figure 4B:
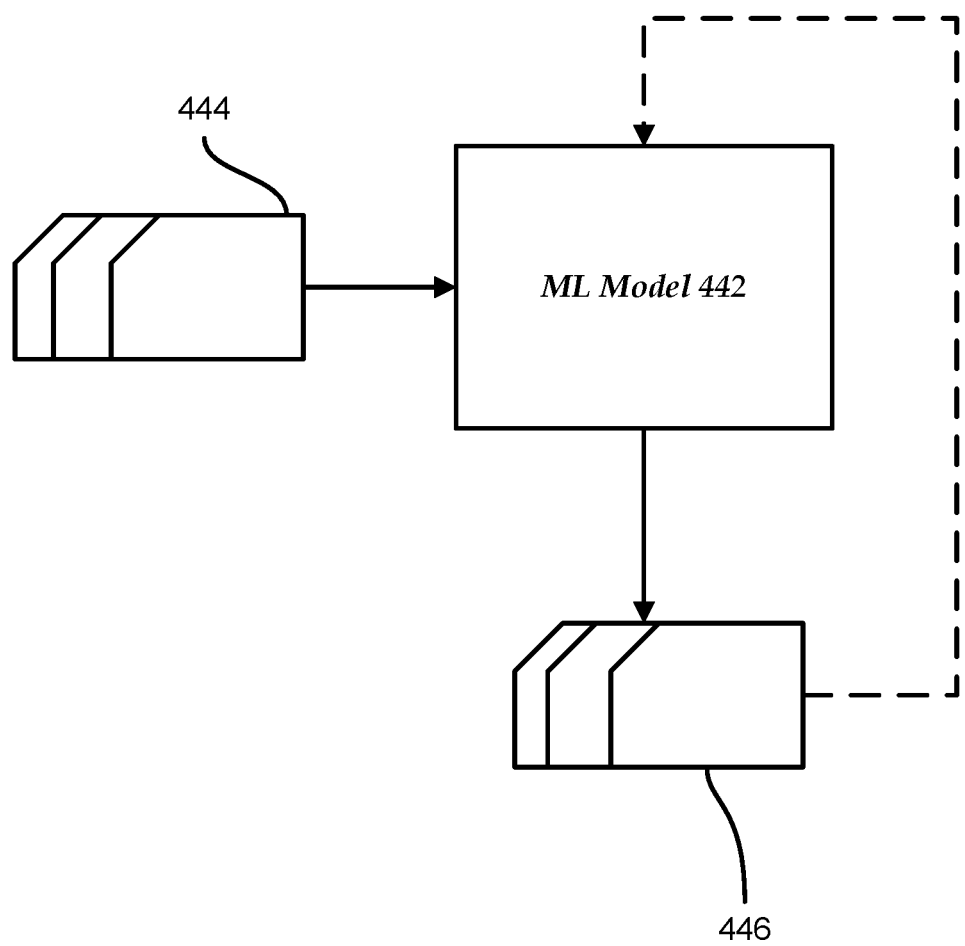
FIG. 4B shows an example machine learning model, in accordance with some embodiments.

One or more machine learning models discussed above may be implemented (e.g., in part), for example, as shown in FIG. 4B. With respect to FIG. 4B, machine learning model 442 may take inputs 444 and provide outputs 446. In one use case, outputs 446 may be fed back to machine learning model 442 as input to train machine learning model 442 (e.g., alone or in conjunction with user indications of the accuracy of outputs 446, labels associated with the inputs, or with other reference feedback information). In another use case, machine learning model 442 may update its configurations (e.g., weights, biases, or other parameters) based on its assessment of its prediction (e.g., outputs 446) and reference feedback information (e.g., user indication of accuracy, reference labels, or other information). In another example use case, where machine learning model 442 is a neural network and connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 442 may be trained to generate results (e.g., response time predictions, sentiment identifiers, urgency levels, etc.) with better recall and/or precision.

In some embodiments, the machine learning model 442 may include an artificial neural network. In some embodiments, machine learning model 442 may include an input layer and one or more hidden layers. Each neural unit of the machine learning model may be connected with one or more other neural units of the machine learning model 442. Such connections can be enforcing or inhibitory in their effect on the activation state of connected neural units. Each individual neural unit may have a summation function which combines the values of all of its inputs together. Each connection (or the neural unit itself) may have a threshold function that a signal must surpass before it propagates to other neural units. The machine learning model 442 may be self-learning and/or trained, rather than explicitly programmed, and may perform significantly better in certain areas of problem solving, as compared to computer programs that do not use machine learning. During training, an output layer of the machine learning model 442 may correspond to a classification, and an input known to correspond to that classification may be input into an input layer of machine learning model during training. During testing, an input without a known classification may be input into the input layer, and a determined classification may be output. For example, the classification may be an indication of whether an action is predicted to be completed by a corresponding deadline or not. The machine learning model 442 trained by the machine learning subsystem 114 may include one or more embedding layers at which information or data (e.g., any data or information discussed above in connection with FIGS. 1-4A) is converted into one or more vector representations. The one or more vector representations of the message may be pooled at one or more subsequent layers to convert the one or more vector representations into a single vector representation.

The machine learning model 442 may be structured as a factorization machine model. The machine learning model 442 may be a non-linear model and/or supervised learning model that can perform classification and/or regression. For example, the machine learning model 442 may be a general-purpose supervised learning algorithm that the system uses for both classification and regression tasks. Alternatively, the machine learning model 442 may include a Bayesian model configured to perform variational inference, for example, to predict whether an action will be completed by the deadline, and/or a communication protocol to use for sending a message (e.g., a reminder message).

Figure 5:
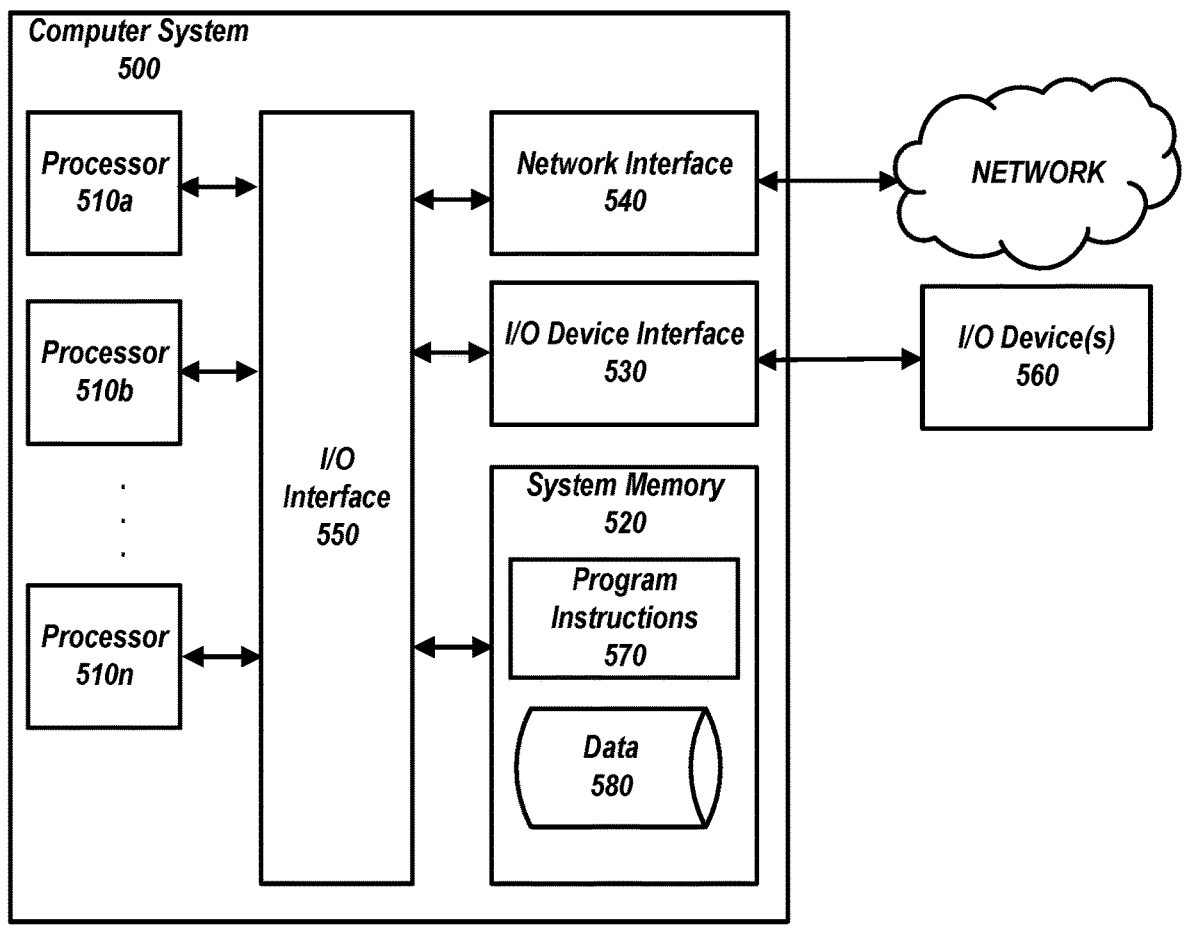
FIG. 5 shows an example computing system that may be used in accordance with some embodiments.

FIG. 5 is a diagram that illustrates an exemplary computing system 500 in accordance with embodiments of the present technique. Various portions of systems and methods described herein, may include or be executed on one or more computer systems similar to computing system 500. Further, processes and modules described herein may be executed by one or more processing systems similar to that of computing system 500.

Computing system 500 may include one or more processors (e.g., processors 510a-510n) coupled to system memory 520, an input/output I/O device interface 530, and a network interface 540 via an input/output (I/O) interface 550. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 500. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 520). Computing system 500 may be a units-processor system including one processor (e.g., processor 510*a*), or a multi-processor system including any number of suitable processors (e.g., 510*a*-510*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 500 may include a plurality of computing devices (e.g., distributed computer systems) to implement various processing functions.

I/O device interface 530 may provide an interface for connection of one or more I/O devices 560 to computer system 500. I/O devices may include devices that receive input (e.g., from a user) or output information (e.g., to a user). I/O devices 560 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 560 may be connected to computer system 500 through a wired or wireless connection. I/O devices 560 may be connected to computer system 500 from a remote location. I/O devices 560 located on remote computer system, for example, may be connected to computer system 500 via a network and network interface 540.

Network interface 540 may include a network adapter that provides for connection of computer system 500 to a network. Network interface may 540 may facilitate data exchange between computer system 500 and other devices connected to the network. Network interface 540 may support wired or wireless communication. The network may include an electronic communication network, such as the Internet, a local area network (LAN), a wide area network (WAN), a cellular communications network, or the like.

System memory 520 may be configured to store program instructions 570 or data 580. Program instructions 570 may be executable by a processor (e.g., one or more of processors 510*a*-510*n*) to implement one or more embodiments of the present techniques. Instructions 570 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 520 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 520 may include a non-transitory computer readable storage medium that may have program instructions stored thereon that are executable by a computer processor (e.g., one or more of processors 510*a*-510*n*) to cause the subject matter and the functional operations described herein. A memory (e.g., system memory 520) may include a single memory device and/or a plurality of memory devices (e.g., distributed memory devices).

I/O interface 550 may be configured to coordinate I/O traffic between processors 510*a*-510*n*, system memory 520, network interface 540, I/O devices 560, and/or other peripheral devices. I/O interface 550 may perform protocol, timing, or other data transformations to convert data signals from one component (e.g., system memory 520) into a format suitable for use by another component (e.g., processors 510*a*-510*n*). I/O interface 550 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 500 or multiple computer systems 500 configured to host different portions or instances of embodiments. Multiple computer systems 500 may provide for parallel or sequential processing/execution of one or more portions of the techniques described herein.

Those skilled in the art will appreciate that computer system 500 is merely illustrative and is not intended to limit the scope of the techniques described herein. Computer system 500 may include any combination of devices or software that may perform or otherwise provide for the performance of the techniques described herein. For example, computer system 500 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 500 may also be connected to other devices that are not illustrated and/or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Ifn some embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present disclosure may be practiced with other computer system configurations.

Figure 6:
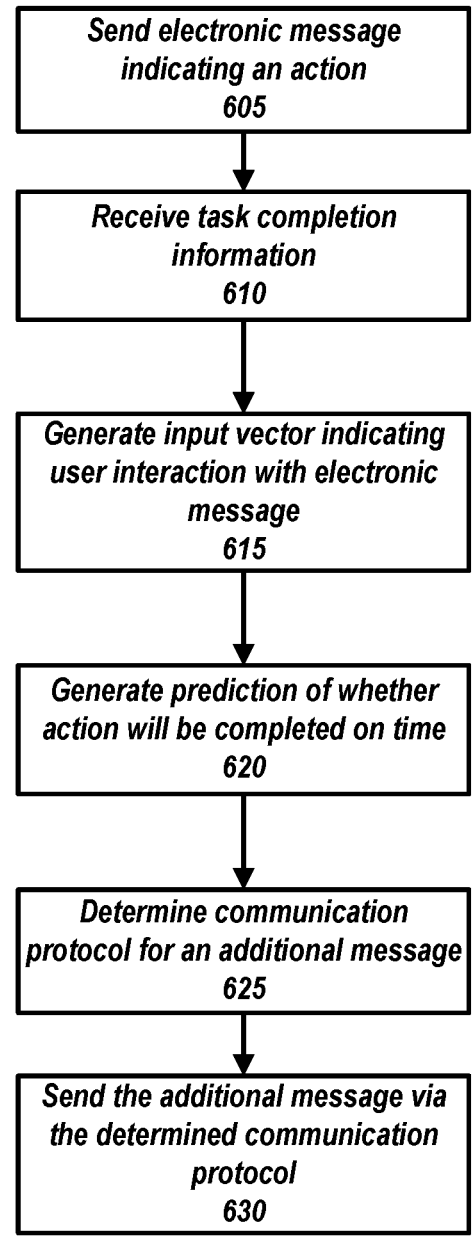
FIG. 6 shows an example flowchart of the actions involved in using machine learning to determine communication protocols, in accordance with some embodiments.

FIG. 6 shows an example flowchart of the actions involved in using machine learning to determine whether to send a reminder message for an action and what communication protocol to use for the reminder message. For example, process 600 may represent the actions taken by one or more devices shown in FIGS. 1-5 and described above. At 605, notification system 102 (e.g., using one or more components in system 100 (FIG. 1) and/or computer system 500 via network interface 540 (FIG. 5)) sends a message. The message may indicate an action for a user to complete. The message may include information to assist the user to complete the task (e.g., a URL) and deadline for completing the task.

At 610, notification system 102 (e.g., using one or more components in system 100 (FIG. 1) and/or computing system 500 via one or more processors 510a-510n and system memory 520 (FIG. 5)) receives action completion information. The action completion information may indicate previous actions associated with the user and indications of whether each action was completed by their corresponding deadlines or not.

At 615, notification system 102 (e.g., using one or more components in system 100 (FIG. 1) and/or computing system 500 via one or more processors 510a-510n, I/O interface 550, and/or system memory 520 (FIG. 5)) generates an input vector indicating user interaction with the message. The input vector may include the action completion information, an indication of whether the action has been completed, and/or user interaction information associated with the message (e.g., whether the user has read the message, whether a URL in the message has been interacted with, whether the message was automatically archived, etc.).

At 620, notification system 102 (e.g., using one or more components in system 100 (FIG. 1) and/or computing system 500 via one or more processors 510a-510n (FIG. 5)) generates a prediction indicating whether the action will be completed on time. The notification system may input the vector generated at 615 into a machine learning model. The machine learning model may output the prediction.

At 625, notification system 102 (e.g., using one or more components in system 100 (FIG. 1) and/or computing system 500 (FIG. 5)) determines a communication protocol for an additional message. The notification system 102 may input the action completion information, an indication of whether the action has been completed, or other any other information discussed in connection with FIGS. 1-5 into a machine learning model (e.g., a reinforcement learning model, a supervised machine learning model, etc.). The machine learning model may output a communication protocol and/or message type to use for sending an additional message. The machine learning model may output an indication that no reminder message should be sent to the user.

At 630, notification system 102 (e.g., using one or more components in system 100 (FIG. 1) and/or computing system 500 via the network interface 540 (FIG. 5)) sends the additional message (e.g., if the machine learning model outputs a recommendation to send an additional message) via the recommended communication protocol to a user device associated with a user.

It is contemplated that the actions or descriptions of FIG. 6 may be used with any other embodiment of this disclosure. In addition, the actions and descriptions described in relation to FIG. 6 may be done in alternative orders or in parallel to further the purposes of this disclosure. For example, each of these actions may be performed in any order, in parallel, or simultaneously to reduce lag or increase the speed of the system or method. Furthermore, it should be noted that any of the devices or equipment discussed in relation to FIGS. 1-5 could be used to perform one or more of the actions in FIG. 6.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several disclosures. Rather than separating those disclosures into multiple isolated patent applications, applicants have grouped these disclosures into a single document because their related subject matter lends itself to economies in the application process. However, the distinct advantages and aspects of such disclosures should not be conflated. In some cases, embodiments address all of the deficiencies noted herein, but it should be understood that the disclosures are independently useful, and some embodiments address only a subset of such problems or offer other, unmentioned benefits that will be apparent to those of skill in the art reviewing the present disclosure. Due to costs constraints, some features disclosed herein may not be presently claimed and may be claimed in later filings, such as continuation applications or by amending the present claims. Similarly, due to space constraints, neither the Abstract nor the Summary sections of the present document should be taken as containing a comprehensive listing of all such disclosures or all aspects of such disclosures.

It should be understood that the description and the drawings are not intended to limit the disclosure to the particular form disclosed, but to the contrary, the intention is to cover all modifications, equivalents, and alternatives falling within the spirit and scope of the present disclosure as defined by the appended claims. Further modifications and alternative embodiments of various aspects of the disclosure will be apparent to those skilled in the art in view of this description. Accordingly, this description and the drawings are to be construed as illustrative only and are for the purpose of teaching those skilled in the art the general manner of carrying out the disclosure. It is to be understood that the forms of the disclosure shown and described herein are to be taken as examples of embodiments. Elements and materials may be substituted for those illustrated and described herein, parts and processes may be reversed or omitted, and certain features of the disclosure may be utilized independently, all as would be apparent to one skilled in the art after having the benefit of this description of the disclosure. Changes may be made in the elements described herein without departing from the spirit and scope of the disclosure as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing actions A, B, C, and D) encompasses both all such attributes or functions being mapped to all such objects and subsets of the attributes or functions being mapped to subsets of the attributes or functions (e.g., both all processors each performing actions A-D, and a case in which processor 1 performs action A, processor 2 performs action B and part of action C, and processor 3 performs part of action C and action D), unless otherwise indicated. Further, unless otherwise indicated, statements that one value or action is "based on" another condition or value encompass both instances in which the condition or value is the sole factor and instances in which the condition or value is one factor among a plurality of factors. The term "each" is not limited to "each and every" unless indicated otherwise. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: sending a message via a first communication protocol to a user device, the message including an action request; in response to determining that the action request has not been completed by the user, generating an input vector for a machine learning model; based on inputting the input vector into a machine learning model, obtaining a prediction indicating that the user will not timely complete the action associated with the action request; inputting the first data from the data structure into a second machine learning model to generate a recommendation to send a second message via a second communication protocol to the user device; based on the generating, sending the second message via the second communication protocol to the user device.

2. The method any of the preceding embodiments, wherein the machine learning model implements a Q-learning network, wherein a value set for the Q-learning network comprises an indication that the action request has been completed before a date associated with the action request, and an action set of the reinforcement learning model comprises sending a modified version of the first message to the user device and sending a second message to the user device via a communication channel different from the first communication channel.

3. The method any of the preceding embodiments, wherein sending the second message comprises one or more of: sending a push notification to the user device to an application that corresponds to the action request; sending the second message using the Simple Mail Transfer Protocol; or sending the second message to a telephone application with a command to execute an automated telephone call.

4. The method any of the preceding embodiments, wherein user interaction information used as input to the machine learning model indicates one or more of whether the first message has been marked as read or whether the message has been automatically archived.

5. The method any of the preceding embodiments, wherein the data structure and the first data further comprise an indication of a frequency the user has accessed an application associated with the action.

6. The method any of the preceding embodiments, wherein generating the recommendation to send the second message comprises inputting an indication of a plurality of states into the machine learning model, wherein each state of the plurality of states indicates an amount of time remaining before a date for completing the action request and an indication of whether the first message has been read.

7. The method any of the preceding embodiments, wherein the information indicating whether the message has been read comprises an indication that a link in the first message has been interacted with via a user device associated with the user.

8. The method any of the preceding embodiments, further comprising: in response to determining to send a second message via the second communication protocol, modifying a setting that prevents future messages from being sent to the user device via the first communication protocol.

9. A tangible, non-transitory, machine-readable medium storing instructions that, when executed by a data processing apparatus, cause the data processing apparatus to perform operations comprising those of any of embodiments 1-8.

10. A system comprising: one or more processors; and memory storing instructions that, when executed by the processors, cause the processors to effectuate operations comprising those of any of embodiments 1-8.

11. A system comprising means for performing any of embodiments 1-8.

What is claimed is:

1. A system for using machine learning models to determine alternative communication protocols for sending messages, the system comprising:
one or more processors and non-transitory media comprising instructions that, when executed by the one or more processors, cause operations comprising:
sending a first electronic message via a first electronic communication protocol to a user device associated with a user, the first electronic message including an action request;
obtaining a data structure comprising a plurality of action requests and a corresponding result for each request of the plurality of action requests indicating whether the user timely completed each request;
generating, based on data from the data structure and user interaction information associated with the first electronic message, a prediction indicating that the user will not timely complete an action associated with the action request;
inputting the data from the data structure into a machine learning model to generate a recommendation to send a second electronic message via a second electronic communication protocol to the user device; and
sending, based on the prediction and the recommendation, the second electronic message via the second electronic communication protocol to the user device.

2. The system of claim 1, wherein the machine learning model implements a Q-learning network, wherein a value set for the Q-learning network comprises an indication that the action request has been completed before a date associated with the action request, and an action set of the machine learning model comprises sending a modified version of the first electronic message to the user device and sending a message to the user device via a communication protocol different from the first electronic communication protocol.

3. The system of claim 1, wherein generating the recommendation to send the second electronic message comprises inputting an indication of a plurality of states into the machine learning model, wherein each state of the plurality of states indicates an amount of time remaining before a date for completing an associated action and an associated indication of whether the first electronic message has been read.

4. A method comprising:
sending a first electronic message via a first electronic communication protocol to a user device associated with a user, the first electronic message including an action request;
obtaining a data structure comprising action requests and results corresponding to the action requests that respectively indicate whether the user timely completed a given request;
generating, based on data from the data structure and user interaction information associated with the first electronic message, a prediction indicating that the user will not timely complete an action associated with the action request;
inputting the data from the data structure into a machine learning model to generate a recommendation to send a second electronic message via a second electronic communication protocol to the user device; and
sending, based on the prediction and the recommendation, the second electronic message via the second electronic communication protocol to the user device.

5. The method of claim 4, wherein the machine learning model implements a Q-learning network, wherein a value set for the Q-learning network comprises an indication that the action request has been completed before a date associated with the action request, and an action set of the machine learning model comprises sending a modified version of the first electronic message to the user device and sending a message to the user device via a communication protocol different from the first electronic communication protocol.

6. The method of claim 4, wherein sending the second electronic message comprises:
sending a push notification to a mobile application that corresponds to the action request;
sending the second electronic message using Simple Mail Transfer Protocol; or
sending the second electronic message to a telephone application with a command to execute an automated telephone call.

7. The method of claim 4, wherein the user interaction information indicates one or more of whether the first electronic message has been marked as read or whether the first electronic message has been automatically archived.

8. The method of claim 4, wherein the data structure further comprise an indication of a frequency the user has accessed an application associated with the action request.

9. The method of claim 4, wherein generating the recommendation to send the second electronic message comprises inputting an indication of a plurality of states into at least one machine learning model, wherein each state of the plurality of states indicates an amount of time remaining before a date for completing an associated action and an associated indication of whether the first electronic message has been read.

10. The method of claim 4, wherein the user interaction information indicating whether the first electronic message has been read comprises an indication that a link in the first electronic message has been interacted with via at least one user device associated with the user.

11. The method of claim 4, further comprising:
based on determining to send the second electronic message via the second electronic communication protocol, modifying a setting that prevents future messages from being sent to the user device via the first electronic communication protocol.

12. One or more non-transitory computer-readable media storing instructions that, when executed by one or more processors, cause operations comprising:
sending a first electronic message via a first electronic communication protocol to a user device associated with a user, the first electronic message including an action request;
obtaining a data structure comprising action requests and results corresponding to the action requests that respectively indicate whether the user timely completed a given request;
generating, based on data from the data structure and user interaction information associated with the first electronic message, a prediction indicating that the user will not timely complete an action associated with the action request;
inputting the data from the data structure into a machine learning model to generate a recommendation to send a second electronic message via a second electronic communication protocol to the user device; and
sending, based on the prediction and the recommendation, the second electronic message via the second electronic communication protocol to the user device.

13. The one or more non-transitory computer-readable media of claim 12, wherein the machine learning model implements a Q-learning network, wherein a value set for the Q-learning network comprises an indication that the action request has been completed before a date associated with the action request, and an action set of the machine learning model comprises sending a modified version of the first electronic message to the user device and sending a message to the user device via a communication protocol different from the first electronic communication protocol.

14. The one or more non-transitory computer-readable media of claim 12, wherein sending the second electronic message comprises sending the second electronic message to a telephone application with a command to execute an automated telephone call.

15. The one or more non-transitory computer-readable media of claim 12, wherein sending the second electronic message comprises sending a push notification to a mobile application that corresponds to the action request.

16. The one or more non-transitory computer-readable media of claim 12, wherein the user interaction information indicates one or more of whether the first electronic message has been marked as read or whether the first electronic message has been automatically archived.

17. The one or more non-transitory computer-readable media of claim 12, wherein the data structure and the data further comprise an indication of a frequency the user has accessed an application associated with the action request.

18. The one or more non-transitory computer-readable media of claim 12, wherein generating the recommendation to send the second electronic message comprises inputting an indication of a plurality of states into at least one machine learning model, wherein each state of the plurality of states indicates an amount of time remaining before a date for completing an associated action and an associated indication of whether the first electronic message has been read.

19. The one or more non-transitory computer-readable media of claim 12, wherein the user interaction information indicating whether the first electronic message has been read comprises an indication that a link in the first electronic message has been interacted with via at least one user device associated with the user.

20. The one or more non-transitory computer-readable media of claim 12, further comprising:
based on determining to send the second electronic message via the second electronic communication protocol, modifying a setting that prevents future messages from being sent to the user device via the first electronic communication protocol.

* * * * *